Aug. 4, 1959  E. GENNING ET AL  2,898,055
REVERSING MECHANISM FOR MAGNETIC SOUND RECORDERS
Filed Oct. 22, 1956  4 Sheets-Sheet 4

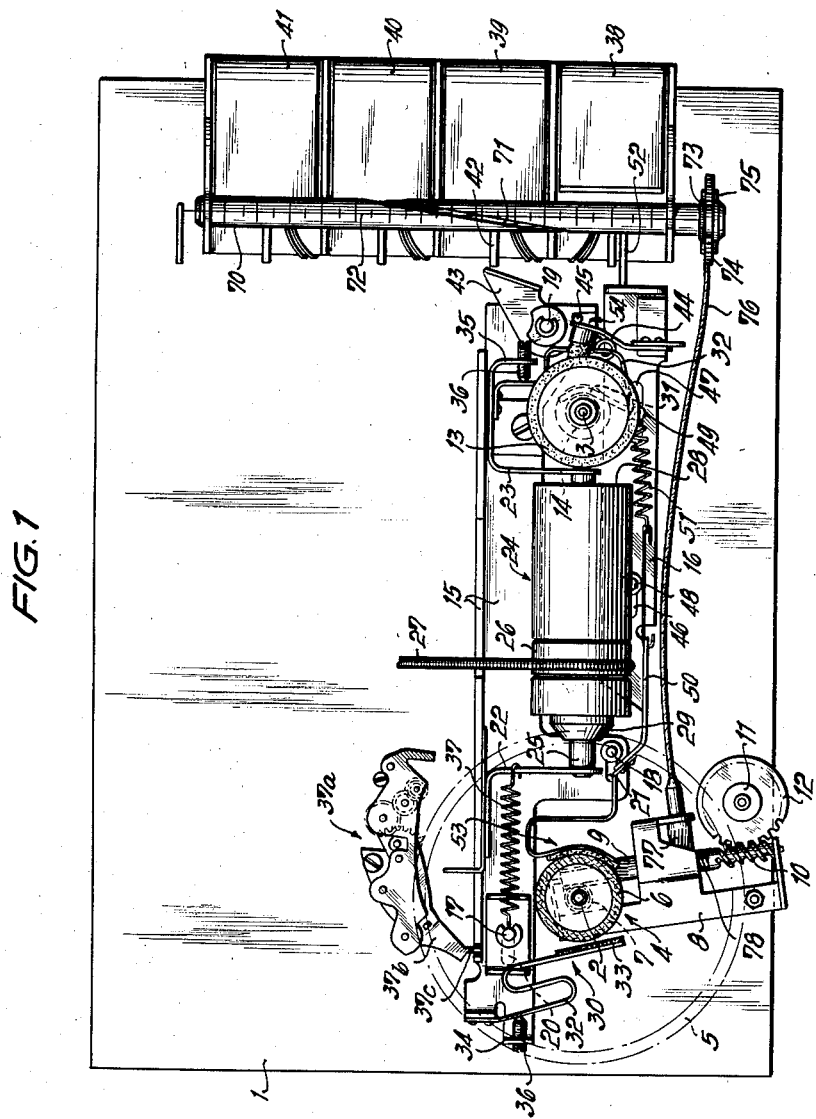

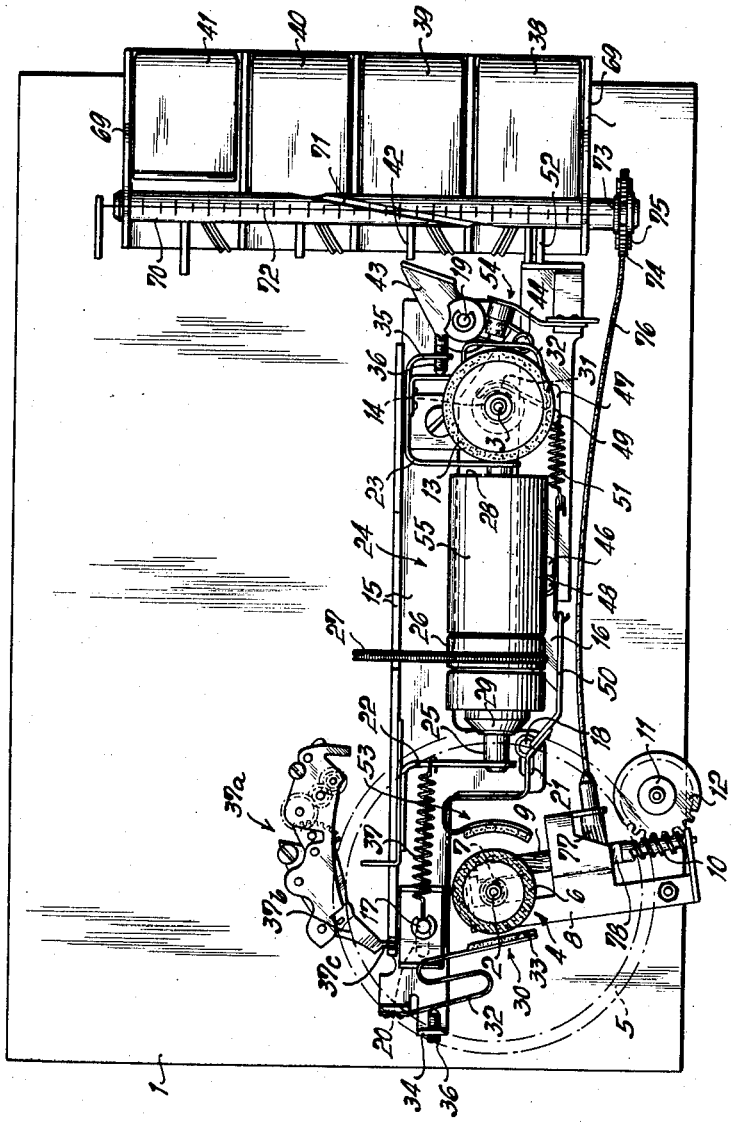

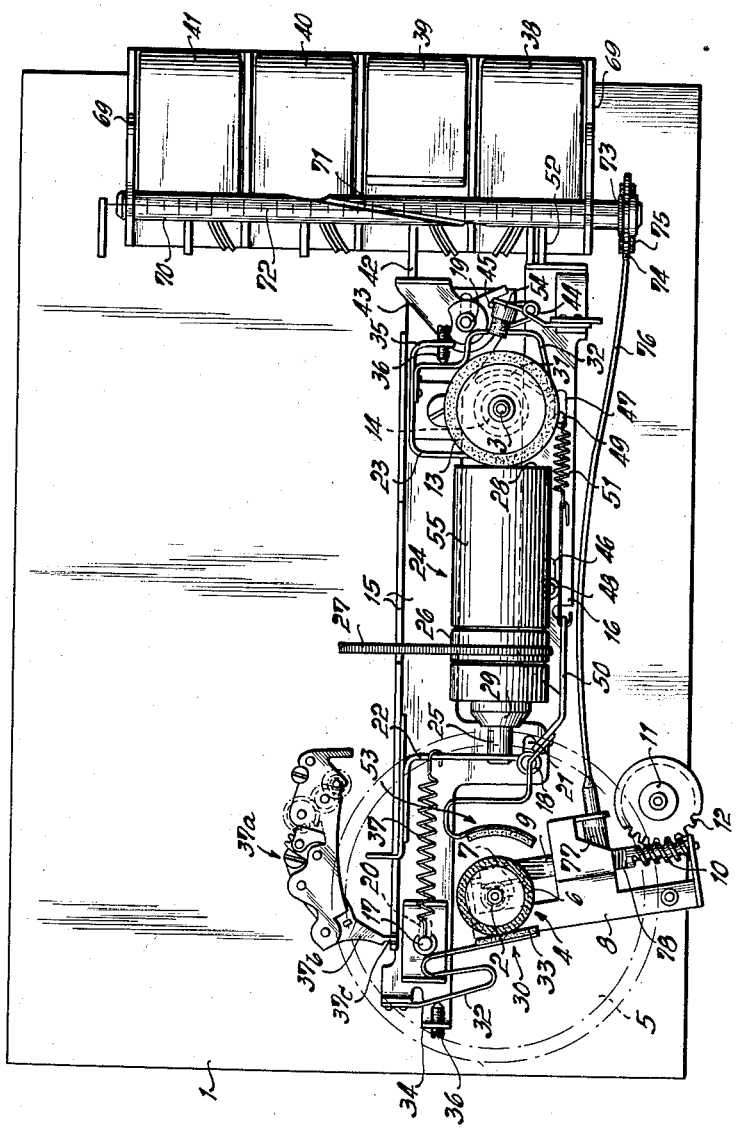

INVENTOR

United States Patent Office 2,898,055
Patented Aug. 4, 1959

2,898,055

REVERSING MECHANISM FOR MAGNETIC SOUND RECORDERS

Ernst Genning, Fassberg uber Unterluess, and Gunther Herrmann, Ronnenberg im Diester, Germany, assignors to Protona Produktionsgesellschaft fuer Electroakustische Geraete G.m.b.H., Hamburg, Germany Application October 22, 1956, Serial No. 617,607

Claims priority, application Germany October 24, 1955

9 Claims. (Cl. 242—55.12)

The invention relates to a reversing mechanism for magnetic sound recorders of miniature design, preferably of pocket size, with a friction drive for the supply- and take-up spools and aims at an especially simple mechanical control for the forward and backward running and for the running brakes and locking brakes.

The reversing mechanism according to the invention is suitable for tape as well as wire.

For reversing transmissions from forward to backward running and vice versa, it is known to displace or deviate a clutch wheel driven by a motor against one or the other spool within the connecting line of their axes. For this purpose, in known transmissions, the clutch wheel is positioned with the motor on a special slide or swiveling part. Furthermore, it is known to actuate stopping brakes for magnetic sound recorders with push rods. Since a magnetic sound recorder besides the stopping brakes requires engaging running or tension brakes alternately on the respectively pulled spools, and since the clutch wheel, the locking brakes and the running brakes have to be actuated in reciprocal modulation, the application of known devices requires a complicated mechanical control. Such controls are receptive to disturbances and can hardly be installed in miniature apparatuses.

An object of the invention is to provide an especially simple and nevertheless extremely reliable reversing mechanism which comprises locating the clutch wheel and the running brakes for the respectively pulled spool on one adjustable slide and the locking brakes for the two spools on another adjustable slide. The slides are operated mechanically by pressing elements effective in the same sense of direction. Thereby it is possible to reverse with such an arrangement the sound carrier spools, the clutch wheel, the running brakes and the locking brakes in reciprocal, positive dependence with only two slides for forward running, backward running and stop.

A further object is to provide a construction wherein the clutch wheel and brakes are carried exclusively by two slides and can be pre-assembled with such slides as complete constructional elements. The assembly and the repair of the apparatus is thereby made much easier. The two slides are movable parallel to a line connecting the spool spindles and their movement in one direction is determined by pressure springs and in the other direction by pressure elements. It is therefore possible on account of the parallel movement of the two slides to control the entire reversal transmission from one side of the device by pressure elements such as, for instance, pressure keys, without complicated mechanical or electrical transmission elements. A pocket apparatus with the reversal mechanism according to the invention, therefore, can be put into a garment pocket and can be easily controlled from the upper side without being removed from the pocket.

A further object of the invention is to provide as a clutch wheel, a clutch roller which is formed as a rotating mass having two different clutch diameters and having end surfaces engaging with the friction discs of the spool spindles. Thereby without using any special transmissions it is possible to operate with a higher speed in the backward or rewind running than in the forward running. The clutch roller according to the invention is connected to a pulley, which in turn is operated elastically by the motor.

The invention will now be further described by way of example, with reference to the accompanying drawings, which illustrate one embodiment of the reversing mechanism according to the invention, with press button control of the switch slide bar. In the drawings:

Fig. 1 is a plan view of the reversing mechanism in the stop position; the top plate of the device not being shown;

Fig. 2 is a similar view of the reversing mechanism in the recording position;

Fig. 3 is again a similar view of the reversing mechanism, this time in the backwards running position;

Figure 5:
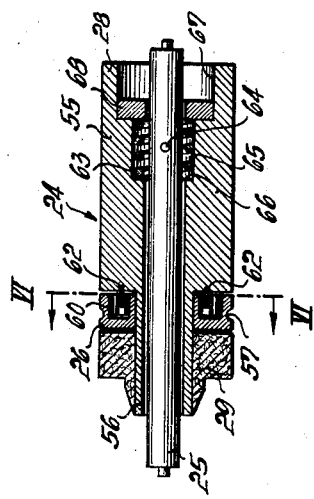
Fig. 5 is an enlarged axial section through the coupling roller.

In Figures 1 to 4, the reversing mechanism is enlarged some 1.5 times with respect to the actual size of the embodiment.

All the elements of the recorder not belonging directly to the invention, in particular the electrical part of the magnetic sound device, the amplifier, its batteries and other fittings of the apparatus, are omitted for the sake of clarity. Likewise the driving motor for the mechanism, the connecting heads for the sound carrier spools and the spools themselves, are not shown as they play no part in the present invention.

The forward running spindle 2 of the take-up spool and the run-back spindle 3 of the supply spool are mounted on a driving mechanism base plate 1 in bearings (not shown). The tops of these spindles 2 and 3 are also carried in bearings in a top plate (not shown) of the device. The forward running spindle 2 carries a friction wheel generally indicated by 4, which consists of an upper friction plate 5 of large diameter and a hub 6 of smaller diameter. Below this hub 6 of wheel 4 a worm thread 7 is carried on spindle 2 and a toothed shaft 9 mounted in a bracket 8 meshes with this worm thread 7. The toothed shaft 9 has, at the end remote from spindle 2, a worm thread 10, which engages in a gear wheel 12 mounted below a cam track-bearing roller 11. The latter serves for the on and off control of the recording sound head (not shown). The run-back spindle 3, like the forward running spindle 2, carries a friction wheel 13 of large diameter above a hub 14 of smaller diameter.

Parallel to the line connecting spindles 2 and 3 are slidable switching bars 15 and 16 displaceable on the base plate 1. For this purpose the switching bar 15 is guided by three pins 17, 18 and 19, mounted on the base plate 1 and engaging in elongated holes or slots 20 and 21 of the flat bar 15 (the third hole or slot for the pin 19 is covered by other members and consequently is not visible). A coupling roller generally indicated by 24 is mounted on slidable bar 15 between two brackets 22 and 23. This coupling roller 24 rotates on a shaft 25 inserted between the brackets 22 and 23, and is slidable in an axial direction with a certain amount of play on this shaft 25. Roller 24, which will be described in detail hereafter, consists essentially of a rotating mass and a driving roller 26 flexibly rotatable about a fixed angle with respect to this rotating mass. The driving roller 26 is connected with a motor (not shown), e.g. an electric or clockwork motor, by way of a spring belt 27, and is always rotated in the same direction. When the slide bar 15 is displaced towards the right (as viewed in the figures, then the end face 28 of the coupling roller 24 lies flexibly against the circumference of the friction wheel 13 of the run-back spindle 3 and imparts a drive to that spindle. If the slide bar 15 is pushed towards the left into the position shown in Figs. 1 and 4, then the other end face 29, of smaller diameter than end 28, presses against the friction wheel 5 of the forward running spindle 2 and imparts a drive to that spindle. With each reversal the coupled spindle 2 or 3, owing to the arrangement of the coupling roller 24 between the two spindles, rotates in the opposite sense to that in the preceding coupling position. By suitable choice of diameter of the end faces 28 and 29 of the coupling roller and of the friction wheels, a fixed speed relation between the forward and run-back actions can be attained, e.g. the reverse speed can be arranged to be six times that of the forward movement.

Two forward running brakes 30, 31 are also mounted on slide bar 15 and are arranged in such a way that the undriven spool is always braked, and in this way the sound carrier is kept taut. Each forward running brake 30, 31 comprises a leaf spring 32 attached to the slide bar 15 and a superimposed layer 33 (only visible in the case of the forward running brake 30) which can be pressed against the hub 6 or 14 respectively. The leaf springs 32 of the two forward running brakes 30 and 31 are adjustable by means of set screws 36 carried in noses 34 and 35 on slide bar 15.

The slide bar 15 is biased to the left by a tension spring 37, suspended between the bracket 22 of the slide bar 15 and the pin 17 on the base plate 1. The displacement of the slide bar 15 towards the right (as viewed) is effected by actuation of a return 39 in the row of operating keys 38, 39, 40 and 41. The key assembly is of known construction, that is, on pressing a key, its actuating nose projects to the left (as viewed) and is locked. On pressing the next key the nose of the first key is released and the first key springs back, while the newly depressed key is locked. On pressing the return key 39, therefore, the nose 42 presses against angle lever 43 pivoted on the pin 19, and the angle lever in its turn, by way of a spring 44, presses a pin 45 carried on slide bar 15 and thus takes the slide bar along with it to the right. The angle lever 43 and the spring 44 assure a clear and positive movement of the slide bar 15 and consequently a good abutment of the end face 28 of the coupling roller 24 against the friction wheel 13, independently of any wear of the nose 42 carried by key 39. Springing back of the slide bar 15, due to the tension spring 37 is delayed by a retarding mechanism 37a, known per se, co-operating with the slide bar 15. The retarding mechanism 37a engages with its release lever 37b for this purpose in a notch 37c of the slide bar 15.

The second slide bar 16 is likewise guided by elongated holes or slots 46 and 47 formed therein, engaging pins 48 and 49 mounted on base plate 1, and is drawn towards the right (as viewed) against the nose 52 of a stop key 38 by a tension spring 51 arranged between the pin 49 and an upstanding bracket 50 on slide bar 16. A first stopping brake 53, which acts on the hub 6 of the forward running spindle 2, is mounted on the upstanding bracket 50 of the slide bar 16 and a second stopping brake 54, which acts on the friction wheel 13 of the run-back spindle 3, is mounted at the opposite end of slide bar 16 to that carrying bracket 50. These two brakes 53 and 54 may be constructed in detail the same as the running brakes 30 and 31. They act simultaneously on the hub 6 and the wheel 13 and are retracted to the right (as viewed) by the tension spring 51 on the release of the slide bar 16 by depression of stop key 38.

Figure 6:
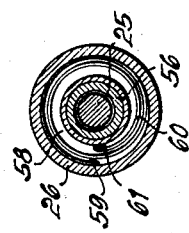
Fig. 6 is a vertical section through the coupling roller taken along the line VI—VI of Fig. 5.
Figure 4:
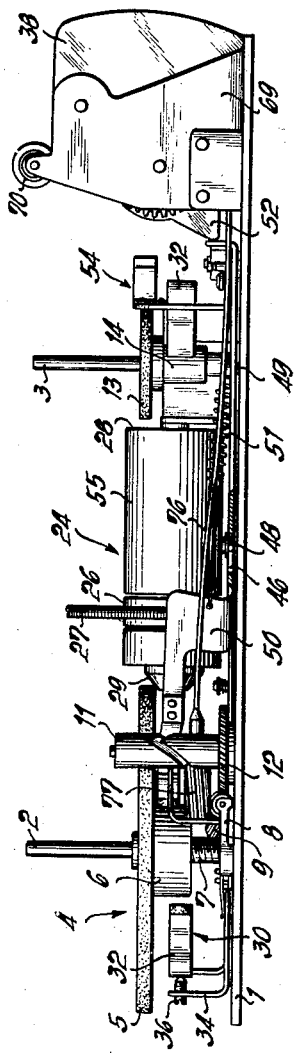
Fig. 4 is a side elevation of the reversing mechanism as shown in Fig. 1, viewed in the direction of the stop key.

The coupling roller 24 running on the shaft 25 consists (see Fig. 5) of a rotating mass 55, which developes into a reduced section 56 at one end, on which reduced section the driving roller 26 is rotatably mounted. The driving roller 26 is located axially by the abutting face of a bush 29 pressed on the reduced section 56, and has a groove 57, in which the spring belt 27 lies. In an annular compartment 58 (Fig. 6) of the driving roller 26, a spiral spring 60 is accommodated, one end of the spring being fixed to the inside of roller 26 at point 59. At its other end, spring 60 is formed into a hook 61, in which pins 62 carried by the rotating mass 55 engage, so coupling the rotating mass flexibly with the driving roller 26. In order that the coupling roller 24 may lie flexibly and with a fixed pressure against its two friction wheels, it is axially and flexibly displaceable on the shaft 25. For this purpose a helical spring 63 is pushed on the shaft 25 and is axially fixed by transverse pin 64. The rotating mass 55 is pushed over this helical spring 63 so that the latter is accommodated within a bore 65 in mass 55. The rotating mass 55 is thus flexibly fixed on the shaft on one side by the bottom face 66 of the bore 65 and on the other side by a disc 68 secured in an enlarged bore 67 of the rotating mass 55 of greater diameter than that of bore 65.

The reversing mechanism operates as follows:

*Stop position.*—When the stop key 38 is pressed down, the slide bar 15 is at its extreme left position as viewed (see Fig. 1) and the coupling roller 24 is coupled with its face 29 against the friction wheel 5 of the forward running spindle 2. Since the motor does not run when the stop key 38 is depressed, the forward running spindle 2 is stationary. The running brake 30 is disengaged whilst the running brake 31 rests against the hub 14 of the run-back spindle 3. The slide bar 16 is pushed into its extreme left position (as viewed) by the nose 52 of the key 38 and locks the two spindles 2 and 3 with its stopping brakes 53 and 54. In the stop position, therefore, neither spindle can rotate with its spool, and even shaking the device will not cause the sound carrier to fall off the spools.

*Recording and reproducing position.*—For this, the key 41 or 40 is depressed, causing key 38 to spring up, so allowing slide bar 16 to move to the right under the influence of spring 51. The stopping brakes 53 and 54 retract and release the spindles 2 and 3. Since the keys 41 or 40 also switch on the motor, the coupling roller 24 is rotated and drives the take-up spindle 2. The slide bar 15 moves during the switching over from stop to recording, so that the running brake 31 brakes the runback spindle 3 which is rotated by the sound carrier being pulled off the supply spool, so that the sound carrier is kept taut. The same switching process occurs when the reproduction key 40 is depressed.

*Return-running position.*—The return running movement of the carrier takes place at greater speed than that used for recording. With the driving mechanism according to the invention, it is possible to switch to run-back directly from the forward running, e.g., for correcting a recording, or from the stop position. On pressing the return or run-back key 39, the previously pressed key (either 38 or 41) springs back and the nose 42 of the return key 39 displaces, by means of the angle lever 43 and the hairpin spring 44, the slide bar 15 to the right (as viewed) so that the coupling roller 24 is disengaged from the friction wheel 5 of the forward running spindle 2 and is connected by means of its end face 28 to the friction wheel 13 of the run-back spindle 3. The motor runs continuously without interruption during the switching over from recording or reproduction to return. On moving the slide bar 15 to the right, the running brake 31 is removed from the run-back spindle 3 and instead brake 30 is pressed against the forward running spindle 2, so that again the spool which is being run off is braked.

If the speed ratio between the forward running and run-back is large, the danger exists that, on switching over from run-back to forward running, the sound carrier will be overloaded and break. Therefore, the running brake 31 in the case of the invention does not release the spindle 2 until some time after the coupling of the coupling roller 24 with the forward running spindle 2 has been effected. The period of this temporary braking is determined by the retarding mechanism 37a acting on the slide bar 15. The retarding mechanism, consequently ensures a flexible reversing movement of the driving mechanism.

The position at any moment of the sound carrier running through the sound recording head is readable on an indicator roller 70 rotatably mounted above the key framework 69. The position is indicated by the point of intersection of a spiral line 71 on the roller 70 with a marking line 72 parallel to the indicator roller. This marking line 72, for example, may be inserted on a glass window of the casing cover of the device. The indicator roller is coupled, via a spring belt 73, a gear wheel 74, a worm gear 75, a flexible shaft 76 and a toothed head 77 mounted in the bracket 8, with a worm thread 78 of the toothed shaft 9, and thus with the forward running spindle 2. With suitable transmission of these coupling elements, the spiral 71 of the indicator roller 70, travels along the whole of the marking line during a complete run of the sound carrier through the driving mechanism.

We claim:

1. A reversing mechanism for magnetic sound recorders having a pair of spaced spools with associated friction discs mounted on a base comprising a first slide reciprocable along a line parallel to a line connecting the axes of said spools, a driven clutch roller also mounted on said slide parallel to said line connecting said axes of said spools and movable to engage one or the other of said friction discs for drivingly engaging said spools, running brakes also mounted on said first slide for engaging the respective spools, a second reciprocable slide parallel to said first slide, locking brakes for said spools mounted on said second slide and means for operating said slides mechanically.

2. A reversing mechanism according to claim 1 wherein tension springs are provided to move the two slides in one direction and pressure elements are provided to move them in the other direction.

3. A reversing mechanism according to claim 1 wherein said clutch roller is formed as a rotating mass having two end surfaces of different diameter engaging said friction discs and having between said end surfaces a coaxial pulley coupled elastically to said clutch roller driven by a motor.

4. A reversing mechanism according to claim 2 wherein said clutch roller is formed as a rotating mass having two end surfaces of different diameter engaging said friction discs and having between said end surfaces a coaxial pulley coupled elastically to said clutch roller driven by a motor.

5. A reversing mechanism according to claim 1 wherein said first slide has slots therein, said base having pins extending into said slots, and means for delaying the displacement of said first slide.

6. A reversing mechanism as set forth in claim 5 wherein said delaying means comprises an adjustable damping element so that upon reversal of the movement of said spools the engagement of said running brakes on said spools is changed only when said clutch roller has been coupled to the other spool for a predetermined time in the reverse driving direction.

7. A reversing mechanism as set forth in claim 2 wherein said first slide is provided with an angle lever cooperating with a pressure element and said lever is coupled by a spring with said slide.

8. A reversing mechanism as set forth in claim 1 wherein the brakes on said slides are adjustable.

9. A reversing mechanism as set forth in claim 5 wherein said second slide is guided by means of pins on said base and is spring tensioned only in the direction which lifts the two locking brakes from the driving spools.

References Cited in the file of this patent
UNITED STATES PATENTS

| | | |
|---|---|---|
| 1,475,470 | Ter Cock | Nov. 17, 1923 |
| 1,883,560 | Chipman | Oct. 18, 1932 |
| 2,438,222 | Lear | Mar. 23, 1948 |
| 2,673,040 | Williams | Mar. 23, 1954 |